United States Patent
Edwards et al.

(10) Patent No.: US 8,056,966 B2
(45) Date of Patent: Nov. 15, 2011

(54) GUTTER SYSTEM FOR VEHICLE STORAGE COMPARTMENT

(75) Inventors: David M. Edwards, Marysville, OH (US); Matthew R. Lux, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 12/210,733

(22) Filed: Sep. 15, 2008

(65) Prior Publication Data

US 2010/0066129 A1    Mar. 18, 2010

(51) Int. Cl.
 *B60R 13/07* (2006.01)
(52) U.S. Cl. ............................ 296/208; 296/37.6
(58) Field of Classification Search ............... 296/208, 296/37.1, 37.2, 37.6, 37.14, 37.16, 38, 39.1, 296/39.2, 1.06

See application file for complete search history.

(56) References Cited

U.S. PATENT DOCUMENTS

| 3,271,066 | A  | * | 9/1966 | Teague ........................ 296/76 |
| 5,417,465 | A  | * | 5/1995 | Koppenstein et al. ....... 296/39.1 |
| 6,155,625 | A  |   | 12/2000 | Felix |
| 6,305,730 | B1 |   | 10/2001 | Stone |
| 6,578,896 | B1 | * | 6/2003 | Peterson ................... 296/97.23 |
| 6,880,875 | B2 |   | 4/2005 | McClure et al. |
| 6,883,851 | B2 |   | 4/2005 | McClure et al. |
| 7,118,151 | B2 | * | 10/2006 | Bejin et al. ................... 296/37.1 |
| 7,156,439 | B2 | * | 1/2007 | Bejin et al. ................... 296/37.1 |
| 7,374,221 | B2 |   | 5/2008 | McClure et al. |
| 7,374,234 | B2 | * | 5/2008 | Deschatres et al. ........... 296/208 |

* cited by examiner

*Primary Examiner* — Glenn Dayoan
*Assistant Examiner* — Gregory Blankenship
(74) *Attorney, Agent, or Firm* — Rankin Hill & Clark LLP (57) ABSTRACT

A gutter system for a vehicle storage compartment includes a bed floor for supporting cargo in a vehicle and a storage compartment having an opening defined in the bed floor. A gutter at least partially surrounds the opening. The gutter includes a main gutter channel disposed adjacent and along an inward side of the opening and lateral gutter channels disposed adjacent and along lateral sides of the opening. At least one discharge channel fluidly connects to the main gutter channel and extends laterally outwardly therefrom to facilitate drainage from the main gutter channel.

20 Claims, 7 Drawing Sheets

FIG. 7

GUTTER SYSTEM FOR VEHICLE STORAGE COMPARTMENT

BACKGROUND

The present disclosure relates to a vehicle storage system, and particularly relates to an improved gutter system for providing drainage to or around a vehicle storage compartment.

Various types of storage compartments and enclosures have previously been devised for meeting the requirements of particular vehicle applications. For example, previous solutions to storage problems in vehicles include trunks, cargo beds, cargo areas, etc. Pickup trucks and like vehicles typically provide a relatively large open storage area (i.e., the load carrying bed) for the vehicle size and are thus often the vehicle of choice for those needing to carry or haul considerable amounts of cargo. However, a significant disadvantage to these types of vehicles is that they often provide relatively little storage space that is securable and protectable, and also conveniently located.

Various solutions have heretofore been proposed to compensate for insufficient storage space in these types of vehicles. For example, tool boxes are available for mounting transversely across the beds of these types of vehicles for access from either side. Shells and caps, typically installed as after-market items, are also available to form enclosures over the load carrying bed. However, all of these solutions have disadvantages, which include expense, inconvenience, customized installation, and functional and space compromises.

One storage solution is to provide a storage compartment in the bed floor of a vehicle. In such an arrangement, the lid of the storage compartment can form a portion of the bed floor and be openable to provide access to the storage compartment. The lid can be provided with a locking mechanism to provide secure storage in the storage compartment.

Storage compartments provided in vehicle beds present an issue concerning drainage. In particular, the lid associated with the storage compartment and forming a portion of the bed floor is provided in a horizontal orientation when closed, as is the opening defining access to the storage compartment. Therefore, a need arises in directing drainage away from the storage opening to prevent the same from entering the storage compartment.

SUMMARY

According to one aspect, a gutter system for a vehicle storage compartment is provided. More particularly, in accordance with this aspect, the gutter system includes a bed floor for supporting cargo in a vehicle and a storage compartment having an opening defined in the bed floor. The gutter system further includes a gutter at least partially surrounding the opening. The gutter includes a main gutter channel disposed adjacent and along an inward side of the opening and lateral gutter channels disposed adjacent and along lateral sides of the opening. At least one discharge channel is fluidly connected to the main gutter channel and extends laterally outwardly therefrom to facilitate drainage from the main gutter channel.

According to another aspect, a storage compartment drainage system is provided. More particularly, in accordance with this aspect, the storage compartment drainage system includes a storage compartment opening defined in a vehicle bed floor. A main gutter channel is disposed adjacent and along an inward side of the storage compartment opening. A first lateral gutter channel is disposed adjacent and along a first lateral side of the storage compartment opening. A second lateral gutter channel is disposed adjacent and along a second lateral side of the storage compartment opening. At least one discharge channel is fluidly connected to the main gutter channel at approximately an intersection between the main gutter channel and one of the first and second lateral gutter channels.

According to still another aspect, a gutter system for providing drainage to a vehicle storage compartment is provided. More particularly, in accordance with this aspect, the gutter system includes a gutter defined in a bed floor around a storage compartment opening. The gutter includes a generally horizontally oriented main gutter channel extending along an inward side of the storage compartment opening and a pair of lateral gutter channels respectively extending along lateral sides of the storage compartment. At least one discharge channel is fluidly connected to the main gutter channel and extends laterally and horizontally away from the main gutter channel for facilitating drainage from the main gutter channel that might otherwise remain due to the generally horizontal orientation of the main gutter channel.

DETAILED DESCRIPTION

Figure 1:
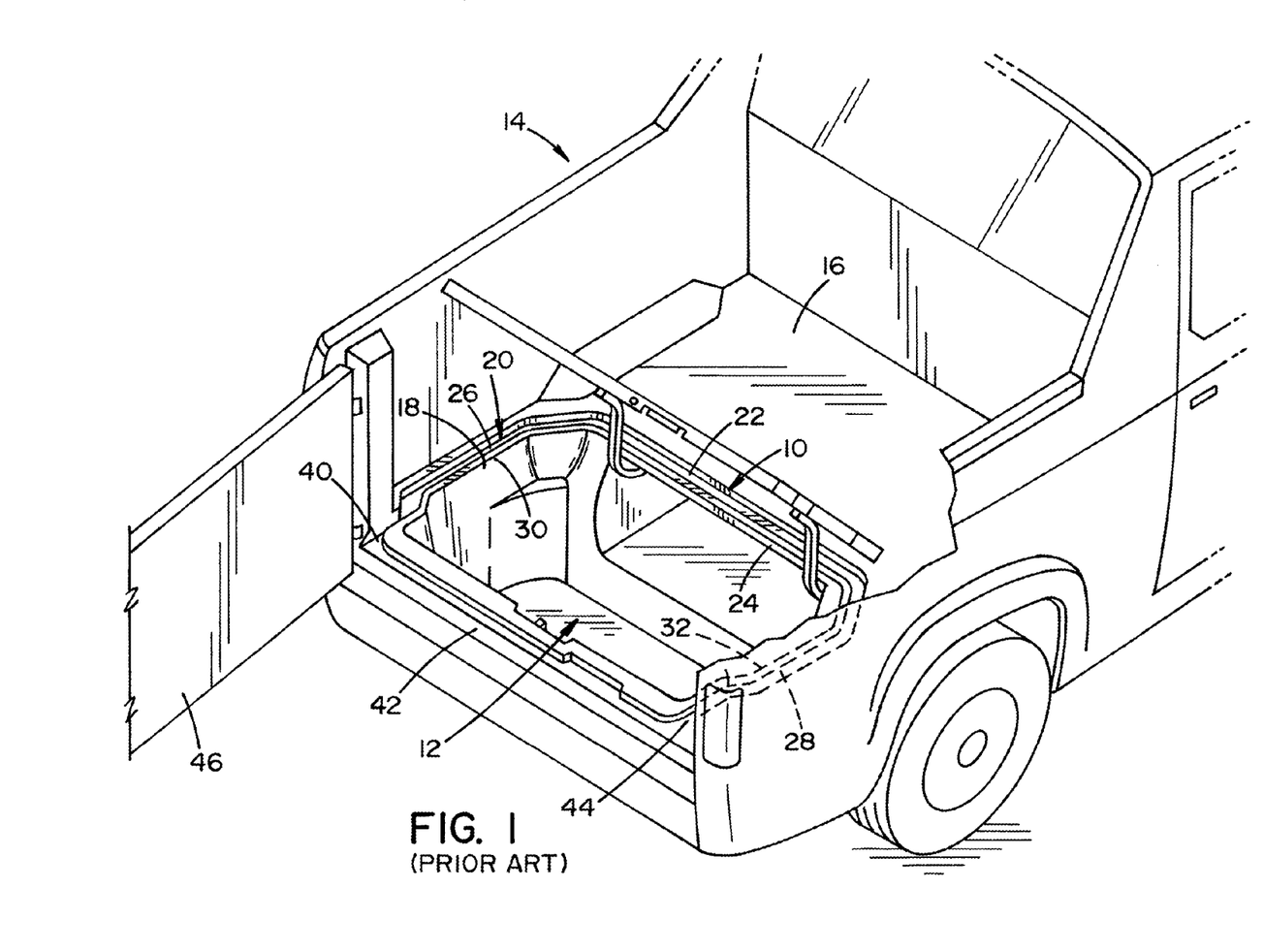
FIG. 1 is a schematic partial rear perspective view of a vehicle with a storage compartment and storage compartment opening defined in the vehicle's bed floor, including a gutter system for directing drainage away from the vehicle storage compartment.
Figure 2:
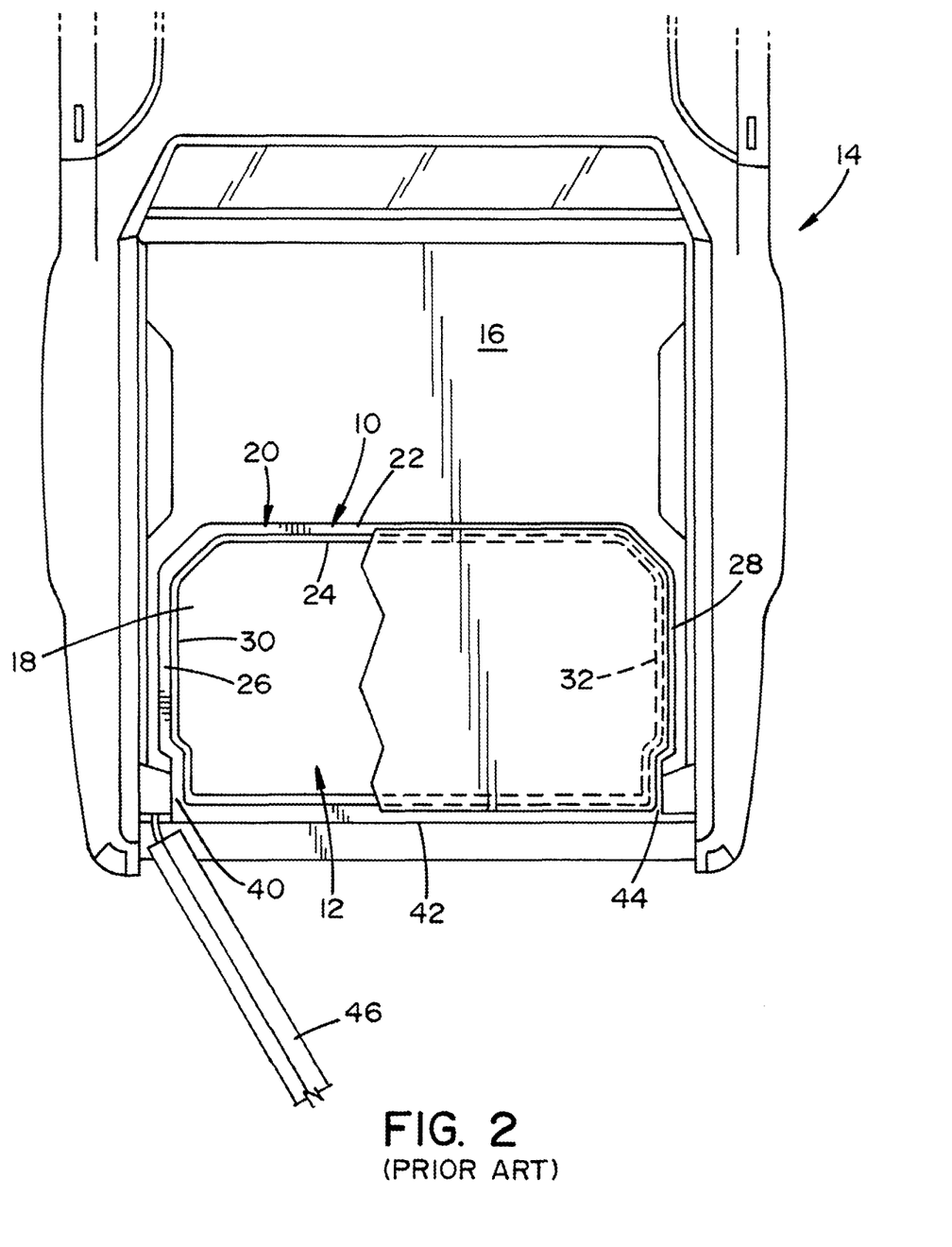
FIG. 2 is a schematic plan view of the vehicle storage compartment and the gutter system of FIG. 1.

Referring now to the drawings, wherein the showings are for purposes of showing one or more exemplary embodiments, FIGS. 1 and 2 show a prior art gutter system 10 for a vehicle storage compartment 12 on vehicle 14. In particular, the vehicle 14 includes a bed floor 16 for supporting cargo and the storage compartment 12 has an opening 18 defined in the bed floor 16. As illustrated, the prior art gutter system 10 includes a gutter 20 at least partially surrounding the storage compartment opening 18. In particular, the gutter 20 includes a main gutter channel 22 disposed adjacent and along an inward side 24 of the opening 18 and lateral gutter channels 26, 28 disposed adjacent and along lateral sides 30, 32 of the opening 18.

For emptying the gutter 20, a first longitudinal discharge channel 40 extends longitudinally outward from the first lateral gutter channel 26 toward a rear 42 of the vehicle 14 and a second longitudinal discharge channel 44 extends longitudinally outward from the second lateral gutter channel 28 toward the rear 42 of the vehicle 14. The gutter 20 collects liquid, such as rainwater, and prevents the same from entering the vehicle storage compartment 12 through the opening 18.

Figure 3:
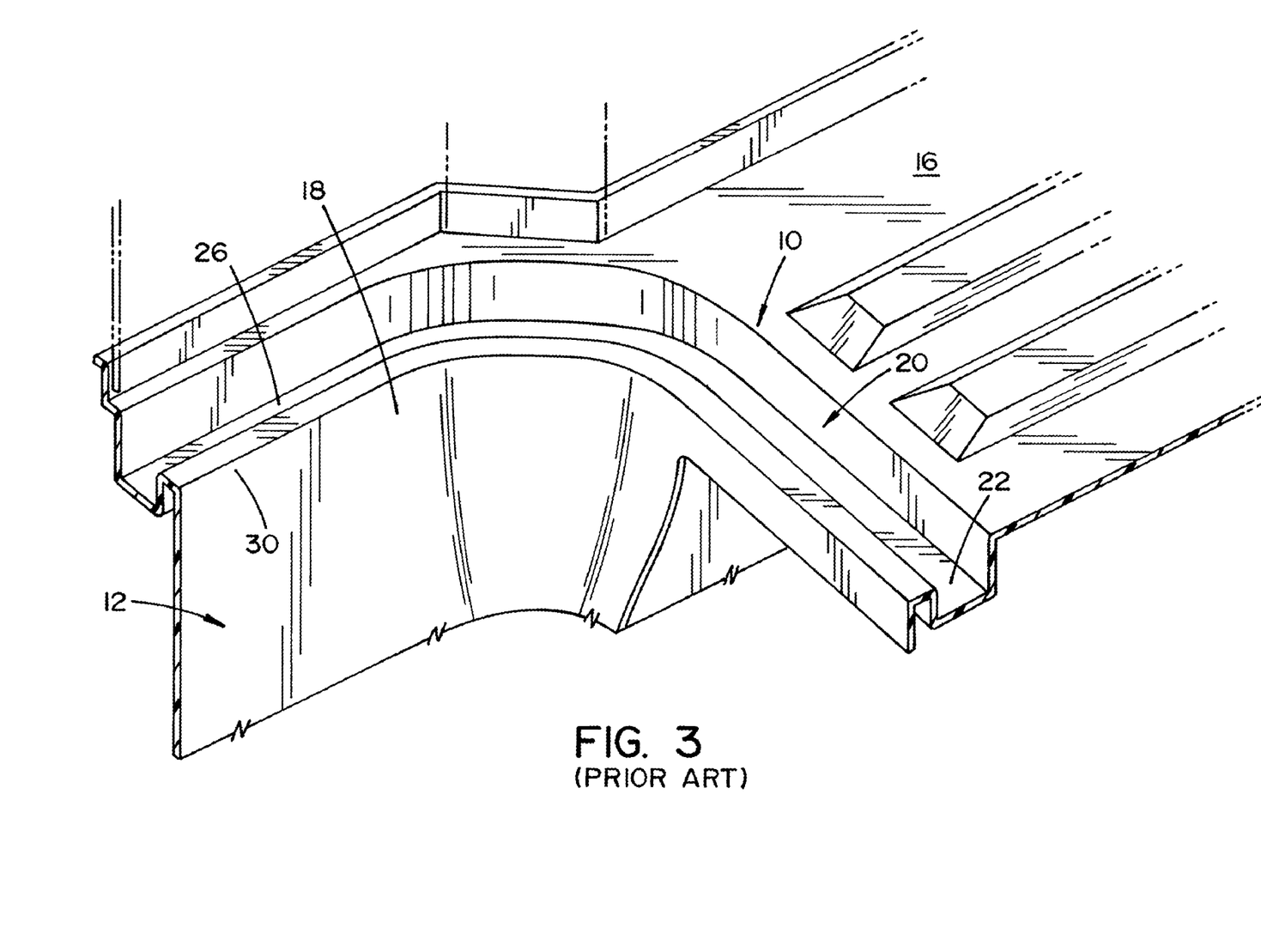
FIG. 3 is an enlarged partial perspective view of the gutter system.

In particular, with additional reference to FIG. 3, water or other liquid collected on the bed floor 16 can be accumulated in the gutter 20, which includes the main gutter channel 22 and the lateral gutter channels 26, 28 (only lateral gutter channel 26 shown in FIG. 3). Liquid collected in the main gutter channel 22 is directed out of the vehicle by the lateral gutter channels 26, 28, and liquid in the lateral gutter channels 26, 28 is directed out of the vehicle 14 by the longitudinal discharge channels 40, 44 which are open to the outside of the vehicle 14 beneath a tailgate 46.

Figure 4:
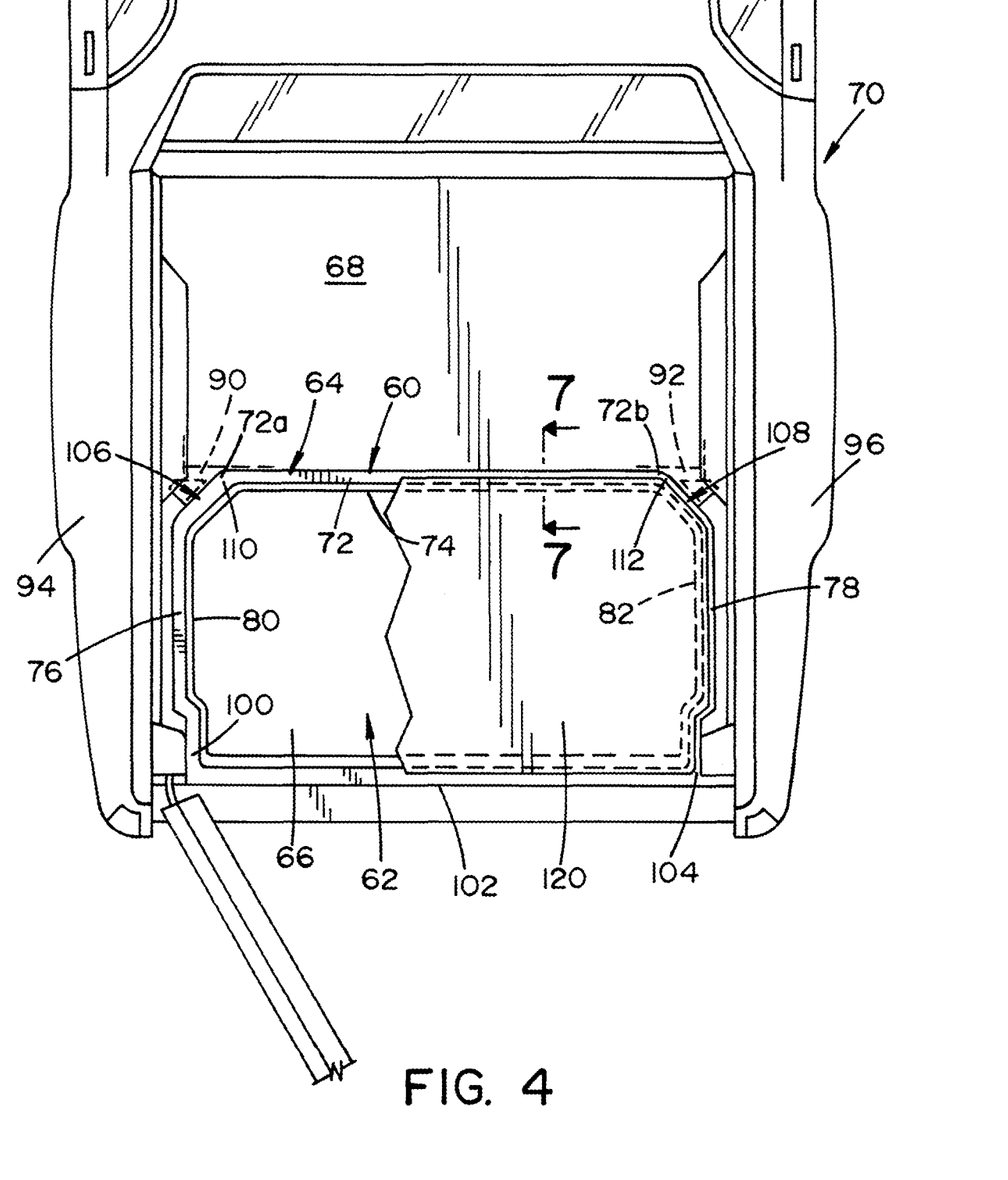
FIG. 4 is a schematic plan view of a vehicle storage compartment and an improved gutter system for the vehicle storage compartment.

Turning to FIG. 4, an improved gutter system 60 is shown for vehicle storage compartment 62. The improved gutter system 60, which is also referred to herein as a storage compartment drainage system, includes a gutter 64 at least partially surrounding a storage compartment opening 66 defined in a bed floor 68 of a vehicle 70, the bed floor 68 for supporting cargo in the vehicle 70.

More particularly, the gutter 64 includes a main gutter channel 72 disposed adjacent and along an inward side 74 of the storage compartment opening 66. The gutter 64 also includes first and second lateral gutter channels 76, 78 disposed adjacent and along lateral sides 80, 82 of the vehicle storage compartment opening. More specifically, the first lateral gutter channel 76 is disposed adjacent and along first lateral side 80 of the storage compartment opening 66 and the second lateral gutter channel 78 is disposed adjacent and along the second lateral side 82 of the storage compartment opening 66.

The improved gutter system 60 further includes at least one lateral discharge channel, such as lateral discharge channels 90, 92, fluidly connected to the main gutter channel 72 and extending laterally outwardly therefrom to facilitate drainage from the main gutter channel 72. In particular, each discharge channel can be fluidly connected to the main gutter channel 72 at approximately an intersection between the main gutter channel 72 and an associated one of the first and second lateral gutter channels (e.g., intersection 106 or 108). The discharge channel can extend from the main gutter channel 72 to a lateral side (e.g., first lateral side 94 or second lateral side 96) of the vehicle 70.

In the illustrated embodiment, the first discharge channel 90 extends laterally outwardly from a first end 72a of the main gutter channel 72 and the second discharge channel 92 extends laterally outwardly from an opposite end 72b of the main gutter channel 72. In particular, the first lateral discharge channel 90 can extend laterally outwardly from the main gutter channel 72 and from the first lateral gutter channel 76 and the second lateral discharge channel 92 can extend laterally outwardly from the main gutter channel 72 and from the second lateral gutter channel 78. In the illustrated embodiment, the first discharge channel 90 extends from the main gutter channel 72 to the first lateral side 94 of the vehicle 70 and the second discharge channel 92 extends from the main gutter channel 72 to the second lateral side 96 of the vehicle 70.

In addition, and like the prior gutter system 10, the improved gutter system 60 can further include at least one longitudinal discharge channel extending longitudinally outward from at least one of the lateral gutter channels 76, 78. In the illustrated embodiment, the gutter system 60 includes a first longitudinal discharge channel 100 extending longitudinally outward from the first lateral gutter channel 76 toward a rear 102 of the vehicle 70 and a second longitudinal discharge channel 104 extending longitudinally outward from the second lateral gutter channel 78 toward the rear 102 of the vehicle 70.

The lateral discharge channels 90, 92 are respectively located or respectively begin approximately at the intersection 106, 108 between the main gutter channel 72 and the respective lateral gutter channels 76, 78. More specifically, the first discharge channel 90 connects to the first lateral gutter channel 76 at a terminal end 110 of the first lateral gutter channel adjacent an outer side of the storage compartment opening (i.e., the first lateral side 80). Likewise, the second discharge channel 92 fluidly connects to the second lateral gutter channel 78 at a terminal end 112 of the second lateral gutter channel.

Figure 7:
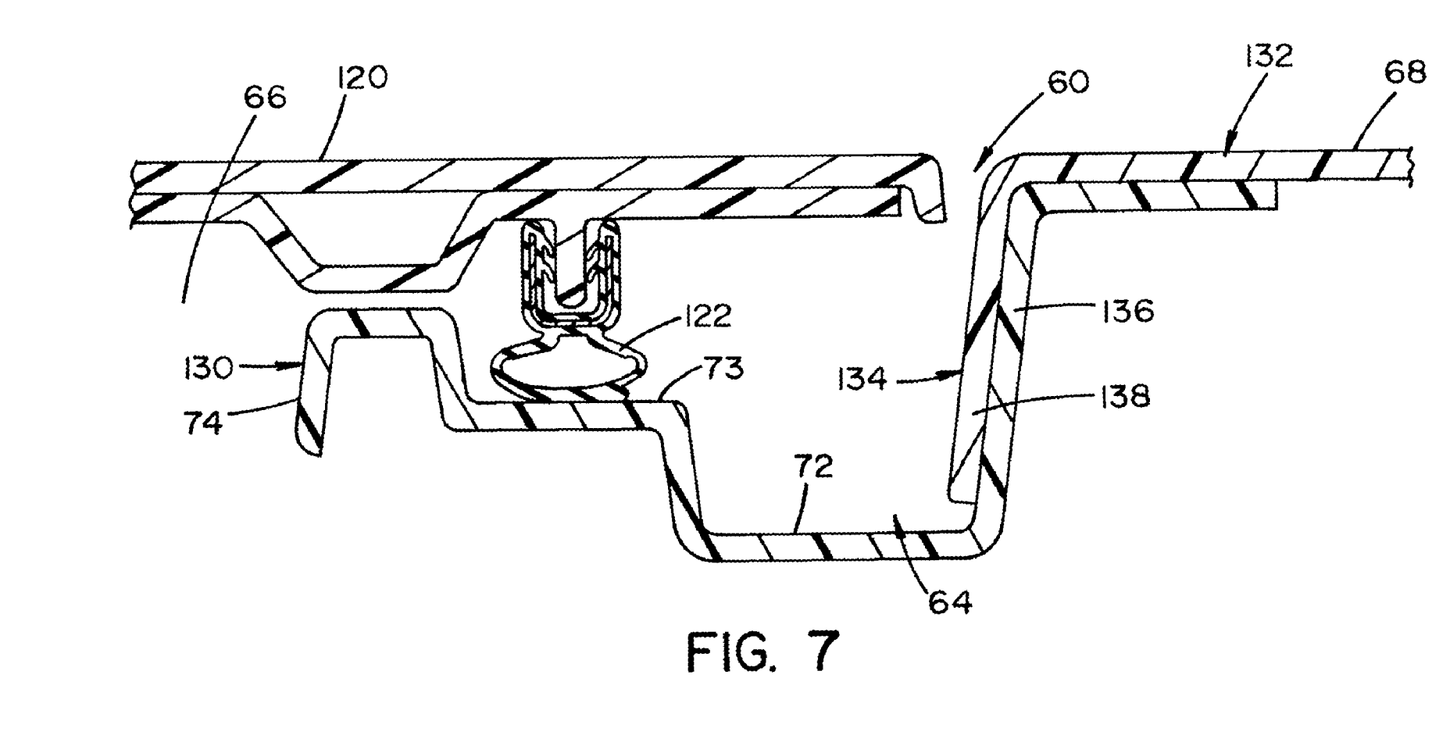
FIG. 7 is a cross sectional view taken along the line 7-7 of FIG. 4 showing a compartment lid with a seal being received in the gutter system.

As illustrated, the storage compartment 62 can further include a lid 120 pivotally disposed over the storage compartment opening 66. More specifically, the lid 120 can be pivotally connected to the bed floor 68 for selectively closing the opening 66 of the storage compartment 62 when in a closed position. With additional reference to FIG. 7, the lid 120 can include a seal or a seal member 122 that is received in the main gutter channel 72 and the first and second lateral gutter channels 76, 78 when the lid 120 is in its closed position. As shown, the gutter 64, including the main gutter channel 72 and the lateral gutter channels 76, 78, can be generally U-shaped in cross section and configured to receive the sealing member 122 of the lid 120 when the lid is closed to limit entry of drainage into the storage compartment 62. In particular, as shown in FIG. 7, the main gutter channel 72 can be generally U-shaped with a raised portion 73 against which the seal 122 rests when the lid 120 is in the closed position. If desired, one or more additional seals could be added to the lid 120, such as more adjacent an edge of the lid 120 to seal with wall 134, for example.

Figure 5:
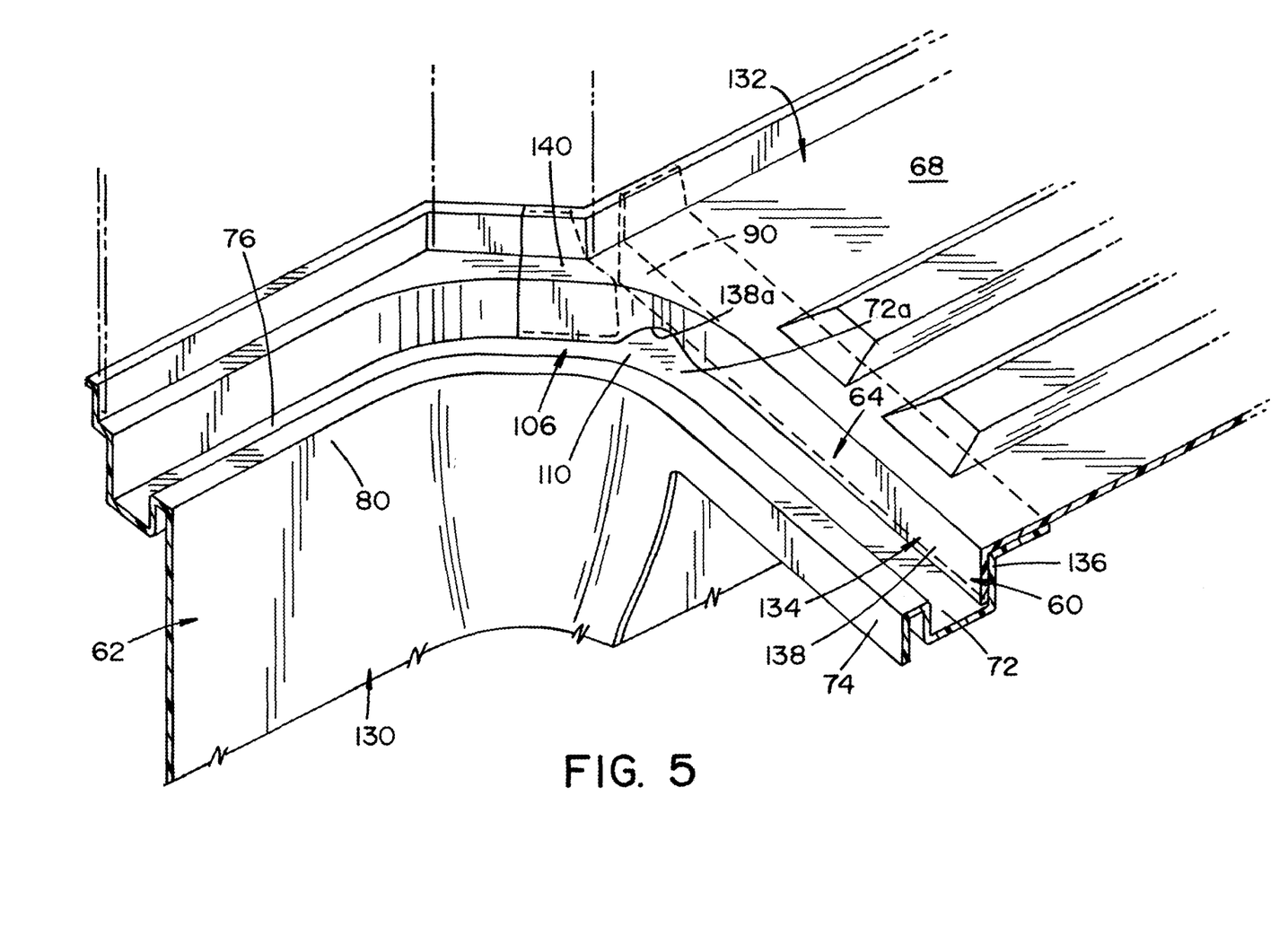
FIG. 5 is an enlarged partial perspective view of the improved gutter system.
Figure 6:
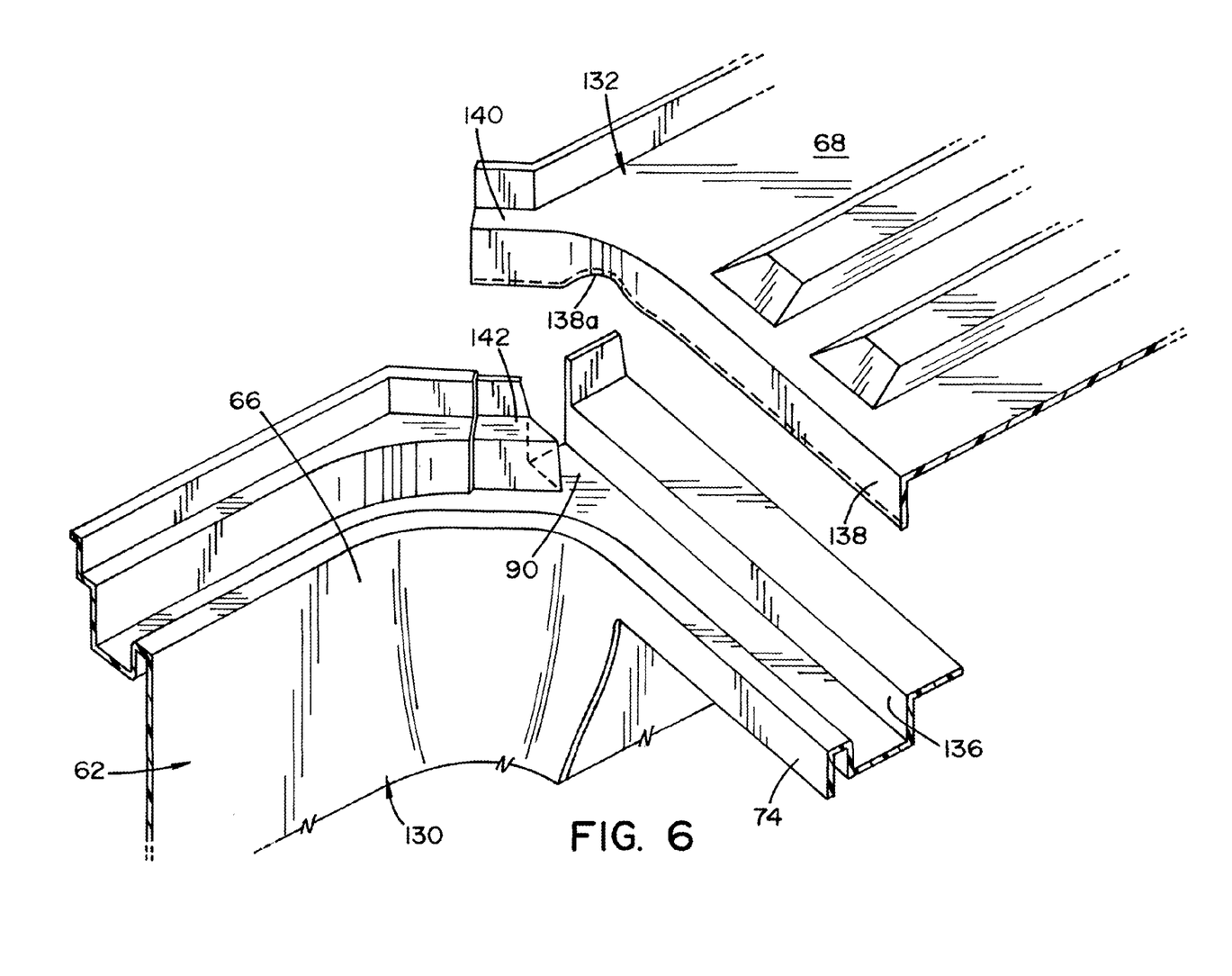
FIG. 6 in an exploded partial perspective view of the improved gutter system of FIG. 5.

Turning to FIG. 6, the vehicle 70 includes a shell 130, which at least partially defines the storage compartment 62 and the opening 66 thereof, and a floor panel structure 132 disposed longitudinally inwardly relative to the shell 130. The bed floor 68 is formed by the shell 130, the floor panel structure 132, and the lid 120 (when the lid is in its closed position). As shown in FIGS. 5 and 6, the floor panel structure 132 overlays at least a portion of the shell 130. More specifically, an inward wall 134 (FIG. 5) defining an inward side of the main gutter channel 72 is formed by a shoulder 136 of the shell 130 and a flange 138 of the floor panel structure 132 overlapping the shoulder 136. A recess 138a is defined in the flange 138 at the location of the first lateral discharge channel 90 for allowing liquid to pass from the gutter 64 into the channel 90. Although not shown, a similar recess can be defined in the flange 138 at the location of the second lateral discharge channel 92 for the same purpose.

As shown, the floor panel structure 132 can include at least one generally horizontal bed floor defining portion 140 that extends over and across (i.e., bridges) at least one of the lateral discharge channels 90, 92. More specifically, in the illustrated embodiment, the floor panel structure 132 includes a pair of such bridge portions 140, though only one is shown in FIGS. 5 and 6. Thus, a first bridge portion 140 bridges over the first discharge channel 90 and a second bridge portion (not shown) bridges over the second discharge channel 92. If desired, the shell 130 can include a recessed portion 142 for providing a flush finish when the floor panel structure 132 is received thereover. This, together with the bridge portions, provides improved aesthetics and improved drainage for the gutter 64 of the gutter system 60.

In the depicted construction described above, the floor panel structure 132 overlays the shell 30 to define the bridge portions 140 extending over the lateral discharge channels 90, 92. The invention, however, is not so limited. It is conceivable, for example, that the shell could be adapted to overlay the floor panel structure to define bridge portions extending over the lateral discharge channels.

It will be appreciated that various of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A gutter system for a vehicle storage compartment, comprising:
   a bed floor for supporting cargo in a vehicle;
   a storage compartment having an opening defined in said bed floor;
   a gutter at least partially surrounding said opening, said gutter including a main gutter channel disposed adjacent and along an inward side of said opening and lateral gutter channels disposed adjacent and along lateral sides of said opening; and
   at least one discharge channel fluidly connected to said main gutter channel and extending laterally outwardly therefrom to facilitate drainage from said main gutter channel, said at least one discharge channel generally colinear with said main gutter channel.

2. The gutter system of claim 1 wherein said at least one discharge channel extends from said main gutter channel to a lateral side of the vehicle and is generally orthogonally oriented relative to said lateral side of the vehicle.

3. The gutter system of claim 1 wherein said at least one discharge channel includes:
   a first lateral discharge channel extending laterally outwardly from said main gutter channel and from a first one of said lateral gutter channels; and
   a second lateral discharge channel extending laterally outwardly from said main gutter channel and from a second one of said lateral gutter channels.

4. The gutter system of claim 3 further including:
   a first longitudinal discharge channel extending longitudinally outward from said first one of said lateral gutter channels toward a rear of the vehicle; and
   a second longitudinal discharge channel extending longitudinally outward from said second one of said lateral gutter channels toward said rear of the vehicle.

5. The gutter system of claim 1 further including:
   at least one longitudinal discharge channel extending longitudinally outward from at least one of said lateral gutter channels.

6. The gutter system of claim 1 wherein said at least one discharge channel is located adjacent an intersection between said main gutter channel and one of said lateral gutter channels.

7. The gutter system of claim 1 further including a lid pivotally connected to said bed floor for selectively closing said opening of said storage compartment when in a closed position, and wherein said gutter is generally U-shaped and receives a sealing member mounted to said lid to limit entry of drainage into said storage compartment.

8. The gutter system of claim 1 wherein said bed floor is formed by a shell at least partially defining said storage compartment and said opening of said storage compartment, by a cargo lid closing said opening when in a closed position, and by a floor panel structure disposed longitudinally inwardly relative to said shell.

9. The gutter system of claim 8 wherein an inward wall defining said main gutter channel is formed by a shoulder of said shell and an overlapping flange of said floor panel structure.

10. The gutter system of claim 8 wherein one of said floor panel structure and said shell overlays a portion of the other one of said floor panel structure and said shell to define at least one bridge portion that extends over and across said at least one discharge channel.

11. The gutter system of claim 10 wherein said at least one discharge channel includes first and second discharge channels extending laterally outward from respective opposite ends of said main gutter channel, and wherein said at least one generally horizontal bed floor defining portion includes a first portion bridging over said first discharge channel and a second portion bridging over said second discharge channel.

12. A storage compartment drainage system, comprising:
   a storage compartment opening defined in a vehicle bed floor;
   a main gutter channel disposed adjacent and along an inward side of said storage compartment opening;
   a first lateral gutter channel disposed adjacent and along a first lateral side of said storage compartment opening;
   a second lateral gutter channel disposed adjacent and along a second lateral side of said storage compartment opening; and
   at least one discharge channel fluidly connected to said main gutter channel approximately at an intersection between said main gutter channel and one of said first and said second lateral gutter channel, wherein a base wall and an inward wall each extend continuously along said main gutter channel and said at least one discharge channel.

13. The storage compartment of claim 12 wherein said at least one discharge channel includes a first discharge channel extending laterally outwardly from a first end of said main gutter channel and a second discharge channel extending laterally outwardly from an opposite end of said main gutter channel.

14. The storage compartment of claim 13 wherein said first discharge channel extends collinearly from said main gutter channel to a first lateral side of the vehicle and said second discharge channel extends collinearly from said main gutter channel to a second lateral side of the vehicle, said first discharge channel approximately orthogonal relative to the first lateral side and said second discharge channel approximately orthogonal relative to the second later side.

15. The storage compartment of claim 12 wherein the at least one discharge channel is fluidly connected to one of the lateral gutter channels at a terminal end of the lateral gutter channel adjacent an outer side of said storage compartment opening.

16. The storage compartment of claim 12 further including a lid pivotally disposed over said storage compartment opening, said lid including a seal that is received in said main gutter channel and in said first and second lateral gutter channels when said lid is in a closed position.

17. The storage compartment of claim 12 wherein said vehicle bed floor is formed by a shell at least partially defining said vehicle storage compartment opening, a cargo lid selectively closing said opening and a floor panel structure disposed longitudinally inwardly relative to said shell, an inward wall defining said main gutter channel is formed by a shoulder of said shell and an overlapping flange of said floor panel structure.

18. A gutter system providing drainage to a vehicle storage compartment in a vehicle, said gutter system comprising:
- a gutter defined in a bed floor around a storage compartment opening, said gutter including a generally horizontally oriented main gutter channel extending along an inward side of said storage compartment opening;
- a pair of lateral gutter channels respectively extending along lateral sides of said storage compartment; and
- at least one discharge channel fluidly connected to said main gutter channel and extending laterally and horizontally away from the main gutter channel for facilitating drainage of liquid from said main gutter channel that might otherwise remain due to the generally horizontal orientation of said main gutter channel, wherein said at least one discharge channel includes a first discharge channel extending from a location adjacent an intersection of said main gutter channel and a first of said pair of lateral gutter channels and a second discharge channel extending from a location adjacent an intersection of said main gutter channel and a second of said pair of lateral gutter channels, said main gutter channel and said first and second discharge channels sharing a base wall that extends from a first lateral side of the vehicle to a second lateral side of the vehicle.

19. The gutter system of claim 18 further including a pair of longitudinal discharge channels fluidly connected to said pair of lateral gutter channels and respectively extending longitudinally from terminal ends of said pair of lateral gutter channels.

20. The gutter system of claim 18 wherein said gutter has a U-shape with said base wall forming a bottom of said U-shape and configured to receive a seal of a cargo lid when said cargo lid is in a closed position closing said storage compartment opening, said seal of said cargo lid removed from said gutter when said cargo lid is moved to an open position.

* * * * *